United States Patent
Lu et al.

(10) Patent No.: US 9,016,647 B2
(45) Date of Patent: Apr. 28, 2015

(54) MONITOR MOUNTING APPARATUS

(71) Applicant: Syncmold Enterprise Corp., New Taipei (TW)

(72) Inventors: Der-Wei Lu, New Taipei (TW); Kuo-Yuan Chou, New Taipei (TW); Chung-Cheng Hu, New Taipei (TW)

(73) Assignee: Syncmold Enterprise Corp., New Taipei (TW)

( * ) Notice: Subject to any disclaimer, the term of this patent is extended or adjusted under 35 U.S.C. 154(b) by 0 days.

(21) Appl. No.: 14/292,885

(22) Filed: May 31, 2014

(65) Prior Publication Data

US 2014/0263905 A1 Sep. 18, 2014

Related U.S. Application Data

(62) Division of application No. 13/295,143, filed on Nov. 14, 2011, now abandoned.

(51) Int. Cl.
*E04G 3/00* (2006.01)
*F16M 13/02* (2006.01)
*F16M 11/10* (2006.01)
*F16M 13/00* (2006.01)

(52) U.S. Cl.
CPC .............. *F16M 13/022* (2013.01); *F16M 11/10* (2013.01); *F16M 13/00* (2013.01); *F16M 13/02* (2013.01); *F16M 2200/041* (2013.01)

(58) Field of Classification Search
USPC .................. 248/317, 220.21, 220.22, 221.11, 248/222.11, 222.51, 222.52, 223.41, 224.7, 248/225.11, 274.1, 276.1, 284.1, 286.1
See application file for complete search history.

(56) References Cited

U.S. PATENT DOCUMENTS

| | | | | |
|---|---|---|---|---|
| 2,483,758 A * | 10/1949 | Douglas | ......................... | 248/242 |
| 2,636,707 A * | 4/1953 | Baker | ....................... | 248/220.22 |
| 5,181,771 A * | 1/1993 | Robak et al. | .................... | 312/7.2 |
| 5,732,919 A * | 3/1998 | Rosen et al. | ............... | 248/274.1 |
| 5,947,429 A * | 9/1999 | Sweere et al. | ............ | 248/123.11 |
| 6,157,418 A * | 12/2000 | Rosen | ............................ | 348/837 |
| 6,189,849 B1 * | 2/2001 | Sweere et al. | .............. | 248/286.1 |
| 6,655,646 B2 * | 12/2003 | Johnson | ...................... | 248/285.1 |
| 7,316,378 B1 * | 1/2008 | Curran et al. | ............... | 248/298.1 |
| 7,408,596 B2 * | 8/2008 | Kunz | ............................. | 348/837 |
| 7,810,781 B2 * | 10/2010 | Lane | ............................. | 248/615 |
| 7,866,619 B2 * | 1/2011 | Yeo | ............................... | 248/284.1 |
| 8,042,782 B2 * | 10/2011 | Lippert et al. | ................ | 248/317 |
| 2005/0205741 A1 * | 9/2005 | Chen | ............................. | 248/317 |
| 2008/0223996 A1 * | 9/2008 | Joanisse et al. | ........... | 248/123.11 |
| 2009/0101780 A1 * | 4/2009 | Revelino et al. | ............ | 248/274.1 |

* cited by examiner

*Primary Examiner* — Terrell McKinnon
*Assistant Examiner* — Michael McDuffie
(74) *Attorney, Agent, or Firm* — Li & Cai Intellectual Property (USA) Office

(57) ABSTRACT

The instant disclosure relates to a monitor mounting apparatus for disposing on a working surface. The mounting apparatus includes a base, an adjusting unit, and a tilt bracket. The base is arranged on the working surface and has at least one guiding member. The adjusting unit includes at least one sliding member and at least one connecting member interconnected. The sliding member may be slidably arranged on the guiding member. The tilt bracket has an outer end portion and at least one connecting portion. The connecting portion is pivotally connected to the connecting member, and the outer end portion is defined on one end of the tilt bracket away from the connecting member. The tilt bracket may be oriented at various angular and vertical positions. The user may adjust the monitor mounting apparatus to suit the person's needs.

7 Claims, 15 Drawing Sheets

MONITOR MOUNTING APPARATUS

CROSS REFERENCE TO RELATED APPLICATION

The present application is a divisional application of co-pending application Ser. No. 13/295,143, filed on Dec. 14, 2011 and entitled "MONITOR MOUNTING APPARATUS", now pending. Moreover, this divisional application contains claims just based on Species III, FIGS. 9-11, according to the Restriction Requirement dated Jan. 13, 2014.

BACKGROUND OF THE INVENTION

1. Field of the Invention

The instant disclosure relates to a monitor mounting apparatus; more particularly, to a mounting apparatus capable of providing (simultaneous) elevation and angle adjustment for an attached monitor.

2. Description of Related Art

For conventional monitor mounting apparatus, such as the "Display Mounting Bracket" disclosed by Taiwan Patent (Patent No.: M390389) as shown in FIG. 1, the bracket usually comprises a wall-mounted first support bar 10, a second support bar 20 pivotally connected to the lower portion of the first support bar 10, and a tilt arm 30 pivotally connected to the first support bar 10 and the second support bar 20 on opposite ends thereof, to enable the angular adjustment of a display 40. However, this design or many other similar variants can only provide a limited angular adjustment range for the display 40 suitable for eye-level viewing only.

Nevertheless, with the widespread use of touch screen displays, a monitor/display can be used for surfing the Internet through the touch-control technology in addition to regular viewing. When the monitor is used for touch/stylus operations, for ergonomic purposes, it is often preferred to arrange the monitor in a direction perpendicular to the mounting wall below the shoulders of a user. Conventional bracket designs could not meet these ergonomic principles. Therefore, the user would be restrained in an uncomfortable position while using the display.

SUMMARY OF THE INVENTION

According to an embodiment of the instant disclosure, a mounting apparatus for use with a monitor (e.g., touch screen monitor), such that the angular and vertical position of the monitor may be adjusted, is provided to meet the user's needs.

The mounting apparatus to be arranged on a mounting surface (e.g., wall surface) comprises: a base having at least one elongated guiding member; an adjusting unit having at least one sliding member and at least one connecting member, where the sliding member can be slidably arranged on the corresponding guiding member; and a tilt bracket having an outer end portion and at least one connecting portion, where the connecting portion is pivotally connected to the corresponding connecting member, whereas the outer end portion is defined on one end of the tilt bracket away from the connecting member. The tilt bracket can be oriented between a first operational position and a second operational position. When the tilt bracket is oriented at the first operational position, the distance between the outer end portion and the wall surface is less than the distance therebetween when the tilt bracket is tilted at the second operational position.

The guiding member is preferably constructed as a C-channel having an elongated slot formed thereon. The sliding member of the adjusting unit is plate-shaped and slidably adapted to travel along the elongated slot.

The base preferably has a rear wall in contact with the wall surface, and the tilt bracket has a support plate. When the tilt bracket is at the first operational position, the support plate is parallel to the rear wall of the base. Whereas when the tilt bracket is at the second operational position, the tilt bracket is arranged normally to the base.

In another embodiment, the base further includes a self-positioning mechanism. The mechanism includes two fixing members and a gas spring. One of the fixing members is secured to the rear wall of the base. Whereas the other fixing member is secured to one of the sliding member of the adjusting unit. The gas spring may be pivotally connected to the fixing members on opposite ends thereof.

The connecting member is preferably plate-shaped. The tilt bracket has a support plate. The connecting portion may extend from the support plate and be pivotally connected to one end of the connecting member. Whereas the other end of the connecting member is fixed to the sliding member.

In yet another embodiment, the connecting portion of the tilt bracket has a notch. The connecting member of the adjusting unit has a locking hole formed thereon. The adjusting unit further includes a locking mechanism. The locking mechanism can selectively abut to the edge portion of the notch of the connecting portion via the locking hole.

The locking mechanism includes a retainer, a compression spring, and an insert. The two ends of the retainer are secured in opposite directions with respect to the locking hole on the connecting member. An accommodating space is defined between the retainer and the connecting member. The accommodating space communicates to the opposite side of the connecting member via the locking hole. The compression spring is received by the accommodating space, and the insert is projected through the compression spring and the locking hole. Whereas the compression spring is abutted by the retainer and the insert at opposite ends. The insert may protrude selectively from the locking hole and be received by the notch.

In some embodiments, the adjusting unit further includes at least one washer assembly and at least one stabilizing unit. The washer assembly is used for the connection between the tilt bracket and the connecting member. The stabilizing unit has an L-bracket and a constant-force spring. The L-bracket is fixed to the rear wall of the base. The constant-force spring is arranged on the L-bracket and is fixed to the sliding member on one end thereof.

In some embodiments, the mounting apparatus further includes at least one tilt arm. The tilt arm has a first end portion and a second end portion formed thereon oppositely. The base further has at least one fixing portion. The first end portion of the tilt arm may be pivotally connected to the fixing portion of the base. Whereas the second end portion of the tilt arm may be pivotally connected to the connecting portion of the tilt bracket. When the tilt bracket is oriented at the first operational position, the sliding member and the connecting member are oriented at a first position. When the tilt bracket is oriented at the second operational position, the sliding member and the connecting member are oriented at a second position.

When the tilt bracket is oriented at the first operational position, the distance between the top edge portion of sliding member and the top edge portion of the guiding member is greater than the distance therebetween when the tilt bracket is oriented at the second operational position.

For the mounting apparatus of the instant disclosure, which is capable of adjusting the angular and vertical position of the monitor, utilizes the aforementioned sliding member and connecting member of the adjusting unit, to pivotally orient the tilt bracket at the first operational position, the second operational position, or other allowable angular positions. Thereby, the ability to adjust the angular and vertical position of the monitor is achieved.

DETAILED DESCRIPTION OF PREFERRED EMBODIMENTS

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

First Embodiment

Figure 1:
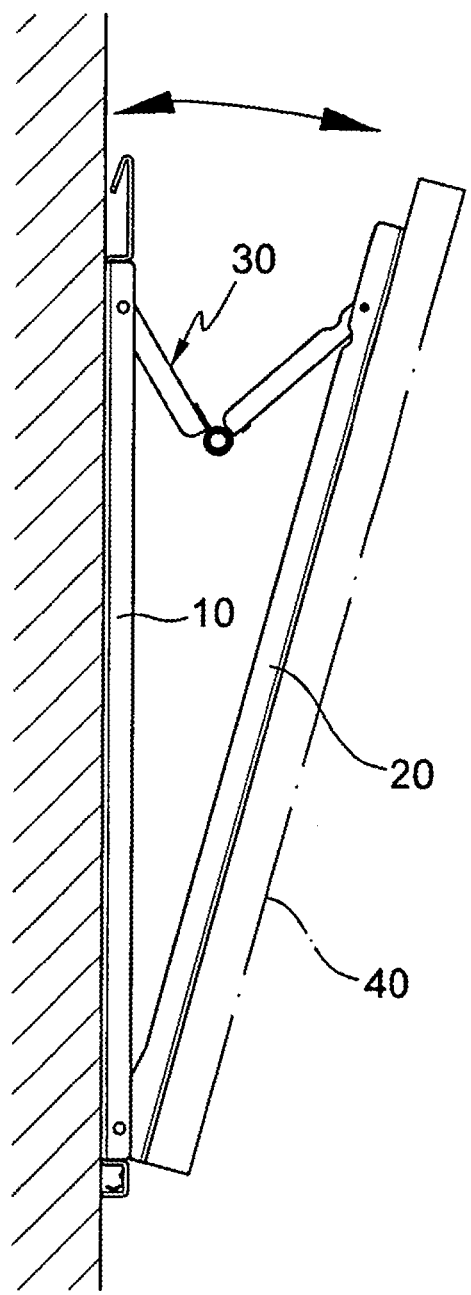
FIG. 1 is a side view of a monitor mounting bracket of the related art.
Figure 2:
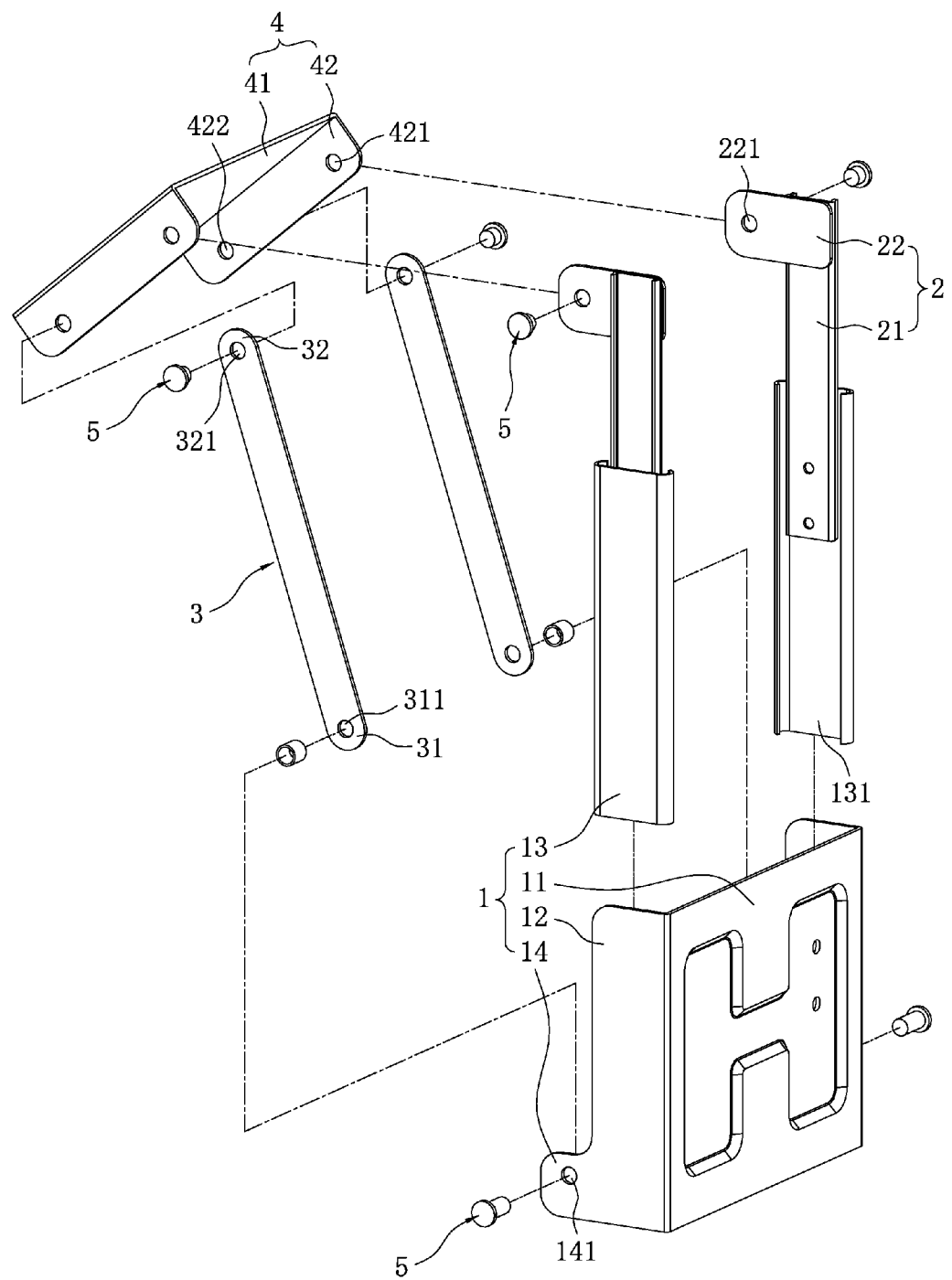
FIG. 2 is an exploded view of a monitor mounting apparatus for a first embodiment of the instant disclosure.
Figure 3:
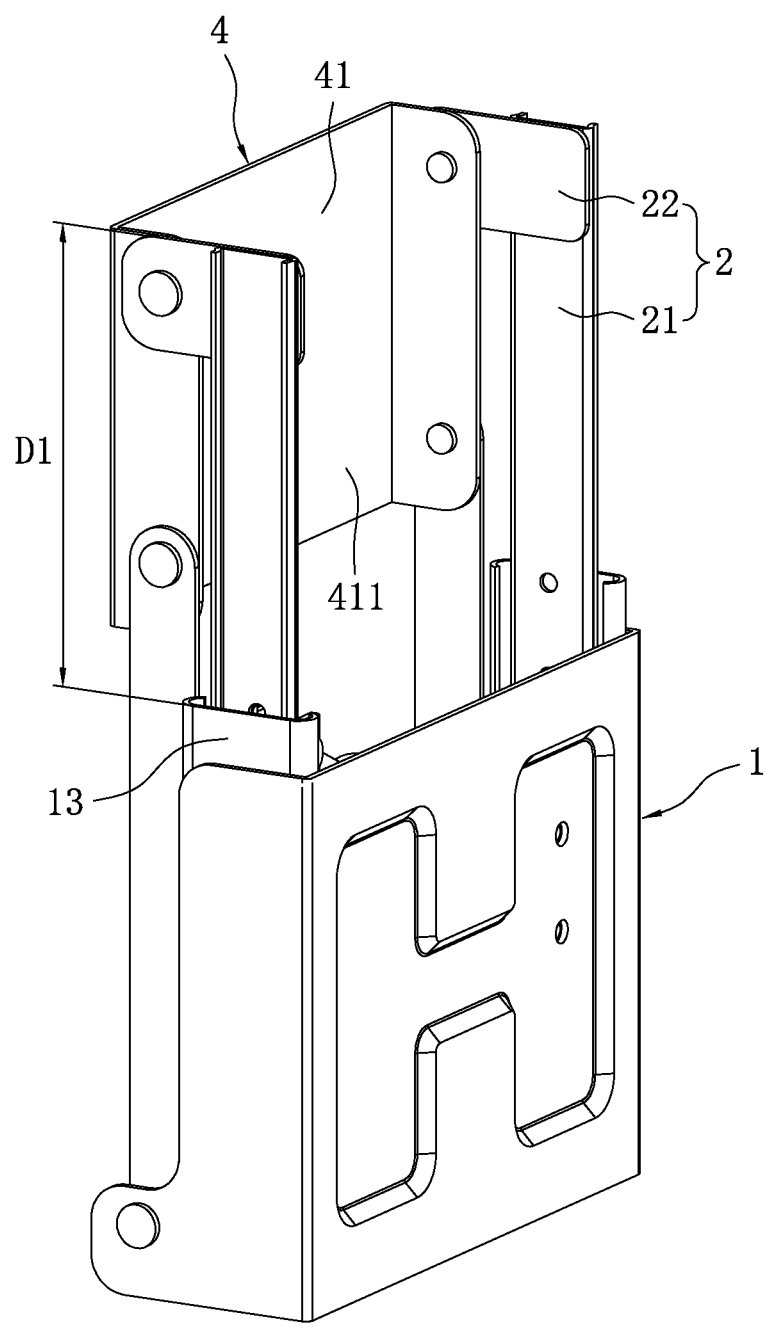
FIG. 3 is a perspective view of the monitor mounting apparatus in FIG. 2 oriented at a vertical position.

Please refer to FIGS. 2 and 3, which show a monitor mounting apparatus for a first embodiment of the instant disclosure. The mounting apparatus comprises a base 1, an adjusting unit 2, a pair of tilt arms 3, a tilt bracket 4, and six pivot pins 5.

As shown in FIG. 2, the base 1 has a plate-shaped rear wall 11 and a pair of sidewalls 12 extending perpendicularly from opposite side portions thereof. Each of the sidewalls 12 is provided with an elongated guiding member 13 on the mutually facing surface thereof. An ear-shaped fixing portion 14 is protruded from each of the sidewall 12 away from the rear wall 11.

The opposite longitudinal side portions of each guiding member 13 are bent toward each other in defining an elongated slot 131 therebetween. Each of the fixing portions 14 has a hole 141 formed thereon.

The aforementioned adjusting unit 2 includes a pair of sliding members 21 and a pair of connecting members 22. Each of the sliding members 21 has a shape that substantially complements the slot 131 of the guiding member 13. Each of the connecting members 22 has a plate-like shape and a hole 221 is formed on one end thereof. The other end portion of each connecting member 22 is fixed to the corresponding sliding member 21.

Each of the sliding members 21 of the adjusting unit 2 can be slidably arranged in the slot 131 of the corresponding guiding member 13 of the base 1.

Each of the tilt arms 3 is plate-shaped, where a first end portion 31 and an opposite second end portion 32 are formed thereon. For each of the tilt arms 3, a hole 311, 321 are formed on the first end portion 31 and the second end portion 32, respectively.

Two pivot pins 5 are inserted through the respective holes 141 of the fixing portions 14 of the base 1 and the respective holes 311 of the first end portions 31 of the tilt arms 3. Thereby, the tilt arms 3 are pivotally connected to the respective fixing portions 14 of the base 1.

The tilt bracket 4 has a flat support plate 41 and a pair of opposite connecting portions 42 extending normally therefrom. Each of the connecting portions 42 has a pair of holes 421, 422 formed oppositely thereon.

Two pivot pins 5 are inserted through the respective holes 221 of the connecting members 22 of the adjusting unit 2 and the respective holes 421 of the connecting portions 42. Thereby, the connecting portions 42 are pivotally connected to the respective connecting members 22 of the adjusting unit 2. Likewise, two more pivot pins 5 are inserted through the respective holes 321 of the second end portions 32 of the tilt arms 3 and the respective holes 422 of the connecting portions 42. Thus, the connecting portions 42 are pivotally connected to the respective second end portions 32 of the tilt arms 3.

Moreover, the support plate 41 has an outer end portion 411 (as shown in FIG. 3) defined thereon away from the connecting members 22.

The pivot pins 5 may generally be any rivet, screw, bolt, split pin, spring pin, snap pin, combination of screw and nut or nail and buckle, or other types of fasteners without restrictions.

Figure 4:
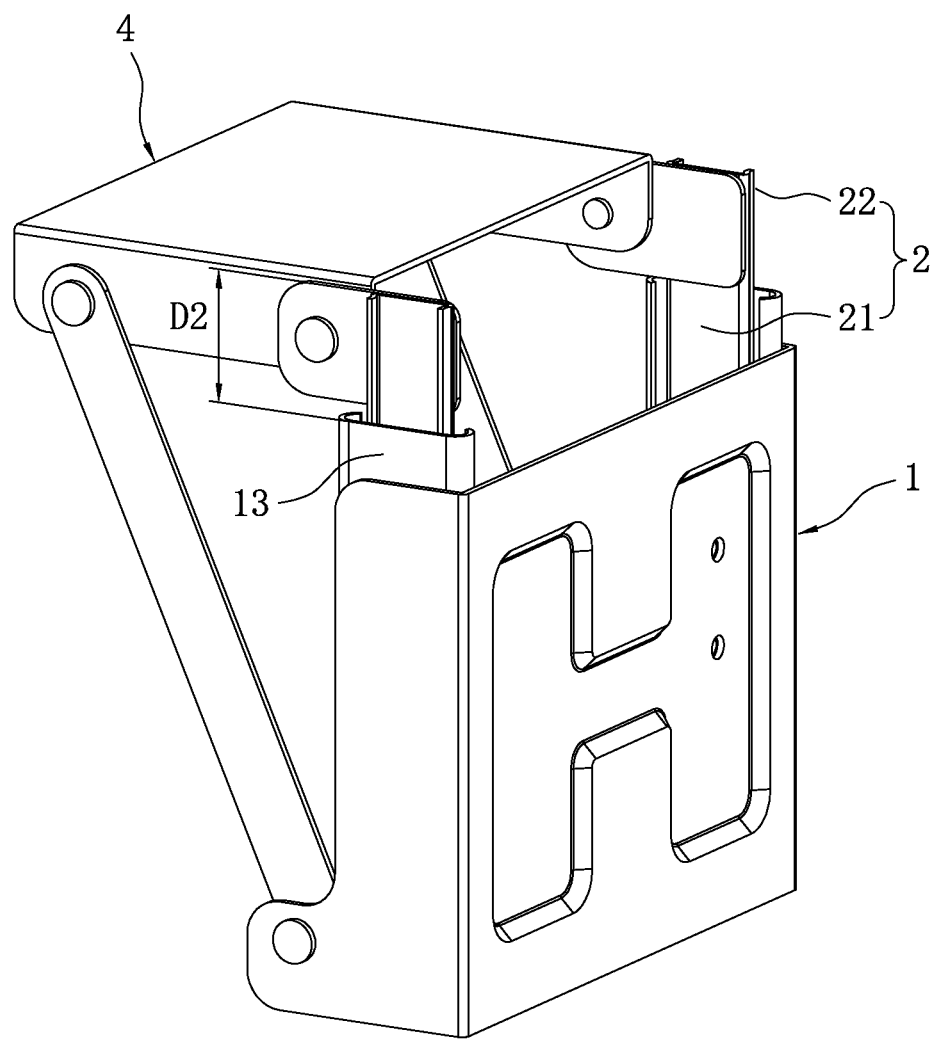
FIG. 4 is a perspective view of the monitor mounting apparatus in FIG. 2 oriented at a horizontal position.
Figure 5:
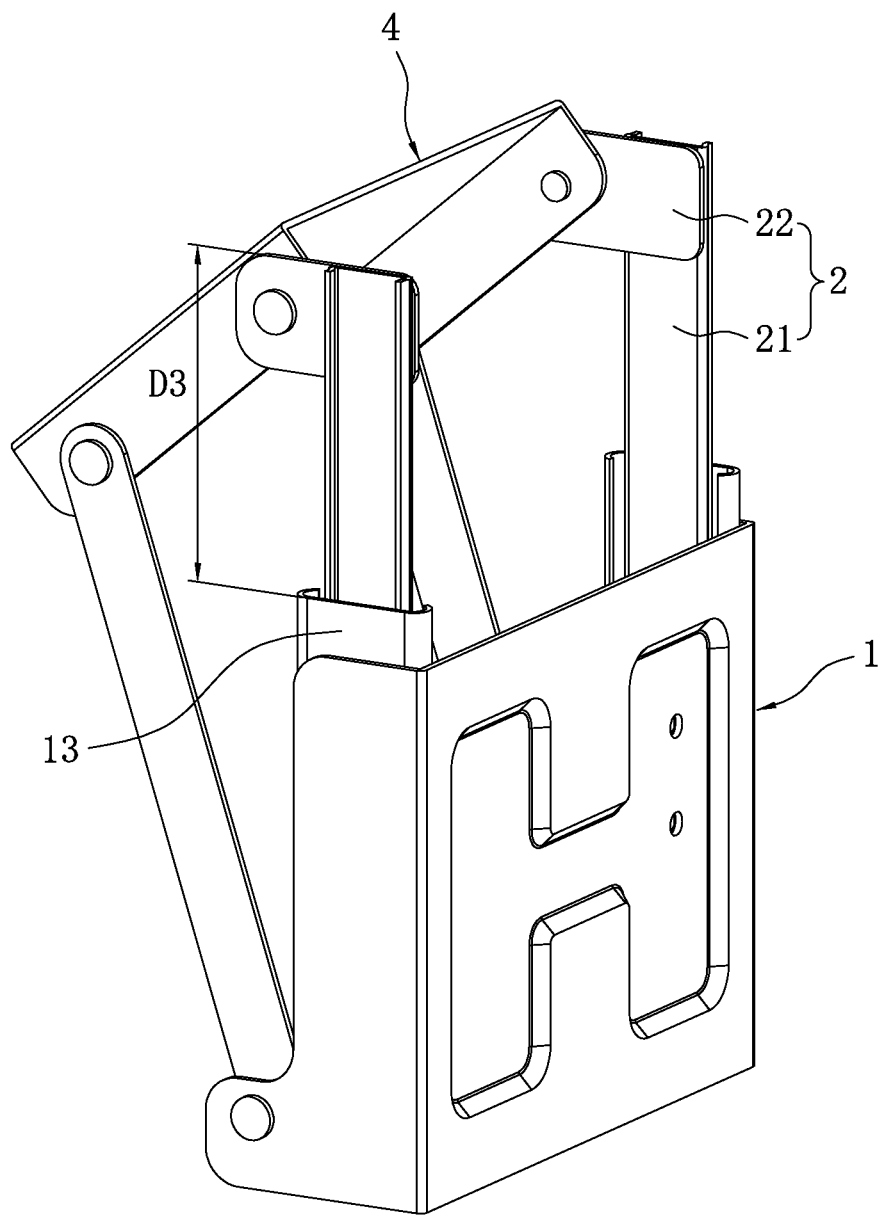
FIG. 5 is a perspective view of the monitor mounting apparatus in FIG. 2 oriented at an intermediate position.

Please refer to FIGS. 3 and 4. The tilt bracket 4 can be actuated by the adjusting unit 2 to a first operational position (as shown in FIG. 3, where the first operational position is herein depicted by the vertical orientation of the tilt bracket 4) or a second operational position (as shown in FIG. 4, where the second operational position is herein depicted by the horizontal orientation of the tilt bracket 4).

More specifically, when the tilt bracket 4 is oriented at the first operational position, the support plate 41 of the tilt bracket 4 is parallel to the rear wall 11 of the base 1. In other words, the angle therebetween is 0°. Concurrently, the connecting sections between the sliding members 21 and the respective connecting members 22 are oriented at a first position (highest position). In other words, most of the sliding members 21 of the adjusting unit 2 are extendably exposed from the respective guiding members 13 of the base 1. The distance between the top edge portion of the sliding member 21 and the corresponding top edge portion of the guiding member 13 is defined as D1.

When the tilt bracket 4 is oriented at the second operational position, the support plate 41 is substantially perpendicular to the rear wall 11 of the base 1. In other words, the angle formed therebetween is substantially 90°. One end of the tilt bracket 4 is connected to the connecting members 22 of the adjusting unit 2, whereas the opposite end of the tilt bracket 4 is connected to the tilt arms 3. Thus, some of the weight of the tilt bracket 4 (or the weight of the tilt bracket 4 plus the supported article) is upheld diagonally by the tilt arms 3. Because the tilt arms 3 are dimensionally longer than the sliding members 21, thus, the tilt bracket 4 can by firmly upheld in the second operational position without collapsing.

When the tilt bracket 4 is oriented at the second operational position, the connecting sections between the sliding members 21 and the respective connecting members 22 are at a second position (lowest position). In other words, most of the sliding members 21 of the adjusting unit 2 are received within the respective slots 131 of the base 1. The distance between the top edge portion of the sliding member 21 and the top edge portion of the corresponding guiding member 13 is herein defined as D2, where D2<D1.

For the instant embodiment, when the tilt bracket 4 is at the second operational position, the angle between the tilt bracket 4 and the base 1 is 90°. However, the angle formed therebetween is not restricted thereto. Based on needs, the range of the angle formed therebetween may be from 60° to 110°.

In accordance to another scenario, the tilt bracket 4 may be arranged at any intermediate position between the first and second operational positions. If the angle between the support plate 41 of the tilt bracket 4 and the rear wall 11 of the base 1 is 90° when the tilt bracket 4 is at the second operational position, an acute angle is formed therebetween when the tilt bracket 4 is at the intermediate position. In other words, the mounting bracket is capable of making angular adjustment to fit the needs of the user. At the intermediate position, the distance between the top edge portion of the sliding member 21 and the corresponding top edge portion of the guiding member 13 is defined herein as D3, where D2<D3<D1.

Figure 6:
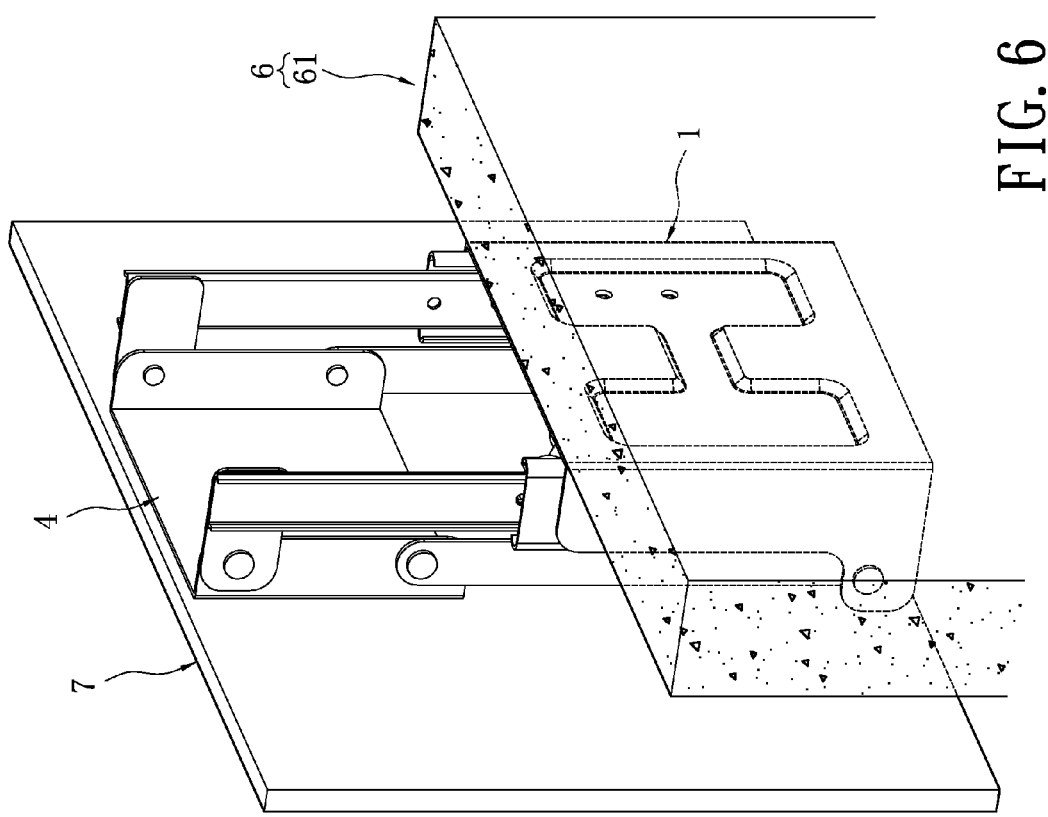
FIG. 6 is a perspective view of the monitor mounting apparatus in FIG. 2 in use, where the monitor is oriented at the vertical position.
Figure 7:
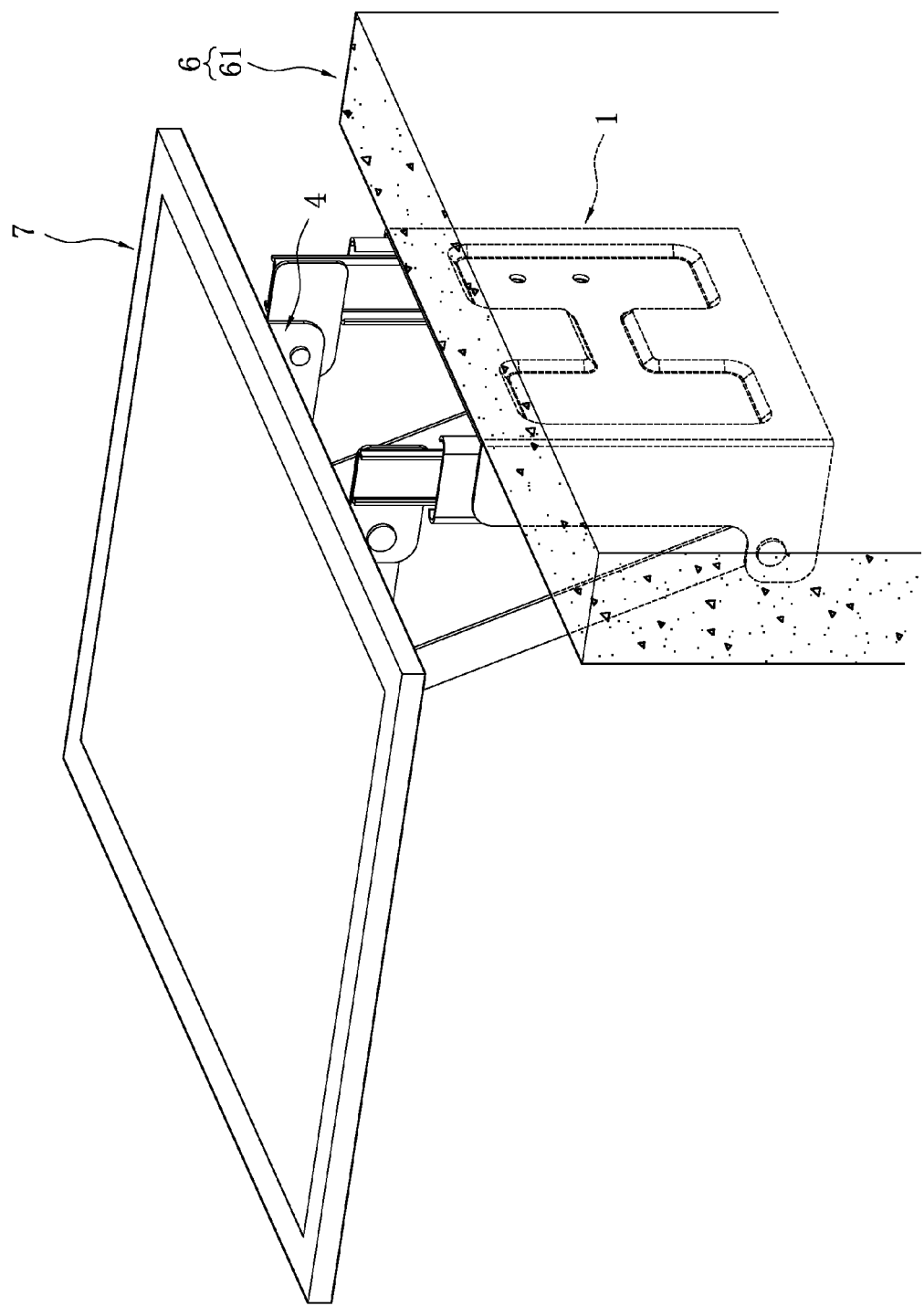
FIG. 7 is a perspective view of the monitor mounting apparatus in FIG. 2 in use, where the monitor is oriented at the horizontal position.

Please refer to FIGS. 6 and 7. When the mounting bracket is put in use, the rear wall 11 of the base 1 can be affixed to a working surface 6 (i.e., a wall surface 61). A monitor 7 is disposed onto the tilt bracket 4, allowing the monitor 7 to be selectably adjusted by the user between the first and second operational positions. In addition, the distance between the outer end portion 411 of the tilt bracket 4 and the wall surface 61 is less when the tilt bracket 4 is at the first operational position, as compared to the distance when the tilt bracket 4 is at the second operational position. In other words, the center of the monitor 7 is closer to the wall surface 61 while at the first operational position versus the second operational position.

The aforementioned monitor 7 may be a touch-screen monitor. Therefore, when the user intends to view the monitor, the tilt bracket 4 may be adjusted to the first operational position. Concurrently, the center of the monitor 7 is closer to the wall surface 61, and the connecting sections between the sliding members 21 and the respective connecting members 22 are at the highest position. The higher position is more suitable for viewing the monitor 7 by the user. The center of the monitor 7 approximately levels to the eyes of the user, while the mounting bracket is concealed by the monitor 7 in achieving aesthetic effect.

When the user intends to interface the touch-screen monitor, the tilt bracket 4 can be adjusted to the second operational position. Concurrently, the center of the monitor 7 is farther away from the wall surface 61, and the connecting sections between the sliding members 21 and the connecting members 22 are at the lowest position. In other words, the touch-screen monitor is brought down to a lower elevation, which is more accessible by the user. The center of the touch-screen monitor is approximately below the shoulders of the user (e.g., near the abdomen) in accordance to the concept of ergonomics. Thereby, the user can be protected from suffering unnecessary stress or strain due to improper posture. Likewise, when the tilt bracket 4 is adjusted to the second operational position, the mounting bracket is concealed by the monitor 7 in achieving aesthetic effect.

Moreover, the tilt bracket 4 for the mounting bracket can also be adjusted to any intermediate position to fit the user's needs.

Second Embodiment

Figure 8:
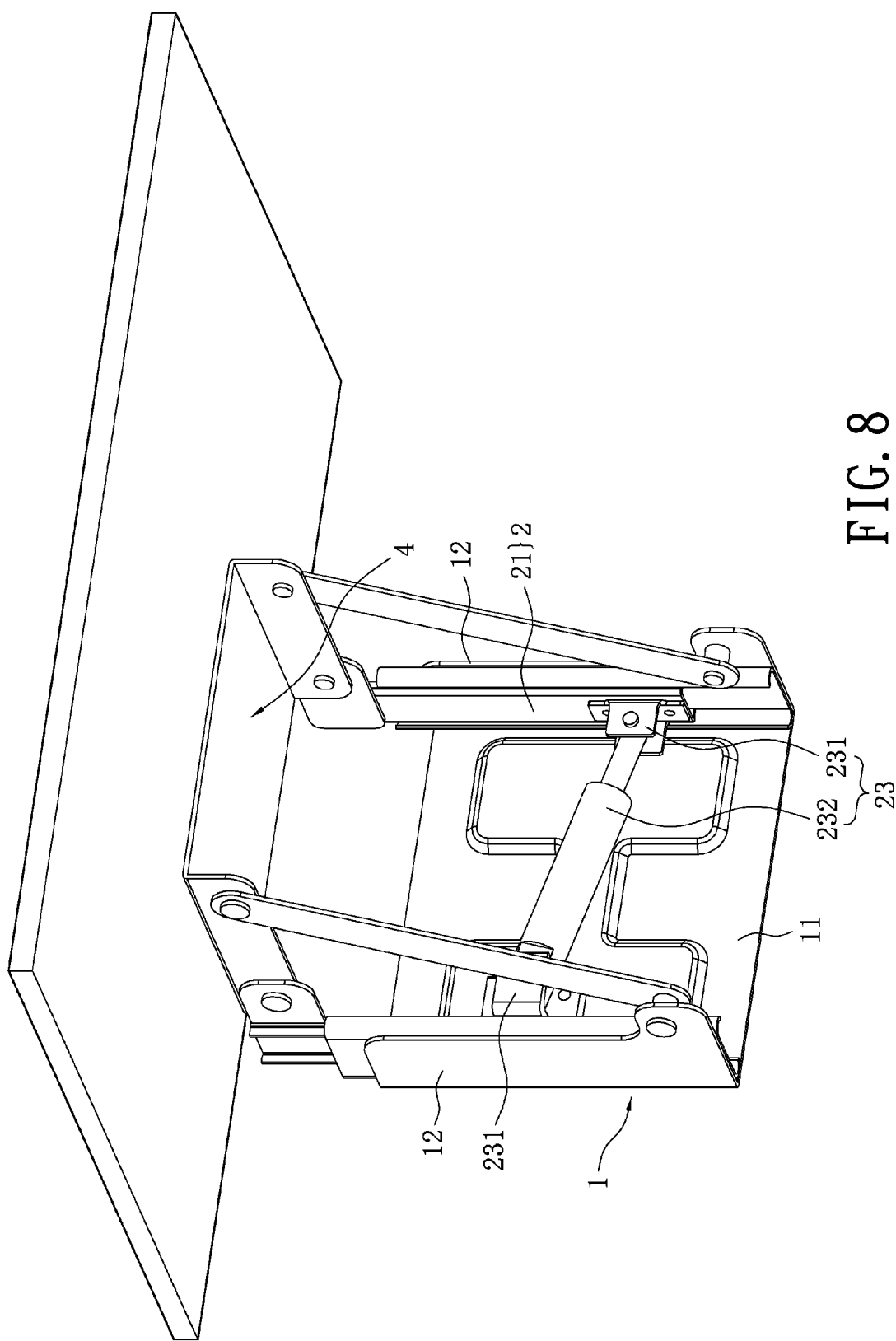
FIG. 8 is a perspective view of a monitor mounting apparatus for a second embodiment of the instant disclosure.

Please refer to FIG. 8, which shows a display mounting bracket for a second embodiment of the instant disclosure. In comparison to the previous embodiment, the difference is that the base 1 of the instant embodiment is further provided with a self-positioning mechanism 23. The self-positioning mechanism 23 includes a pair of fixing members 231 and a gas spring 232. The gas spring 232 has a pressure cylinder filled during manufacturing with nitrogen. The pressured gas generates an axial force on the cylinder-rod system, but is not restricted thereto. A metallic spring is also serviceable.

More specifically, the fixing members 231 are arranged in adjacent to the respective sidewalls 12 of the base 1. The fixing members 231 are fixed to the rear wall 11 of the base 1 and one of the sliding members 21, respectively. The gas spring 232 are pivotally connected on opposite ends to the respective fixing members 231.

When the mounting bracket is put in service, the gas spring 232 works as a compression spring and enables the sliding members 21 of the adjusting unit 2 to self-position, thus less user effort is needed to move the sliding member 21 along the guiding member 13. When the fixing members 231 and the gas spring 232 are leveled, the gas spring 232 is at the most compressed state, thus storing the greatest amount of mechanical energy. When the two fixing members 231 and 232 are biased out of the leveled state, as shown in FIG. 8, the gas spring 232 would release the stored mechanical energy and generate a pushing force on the fixing members 231 as the elevation of the sliding members 21 changes, thus assisting the sliding movement of the tilt bracket 4 toward the first or second operational position.

Third Embodiment

Figure 9:
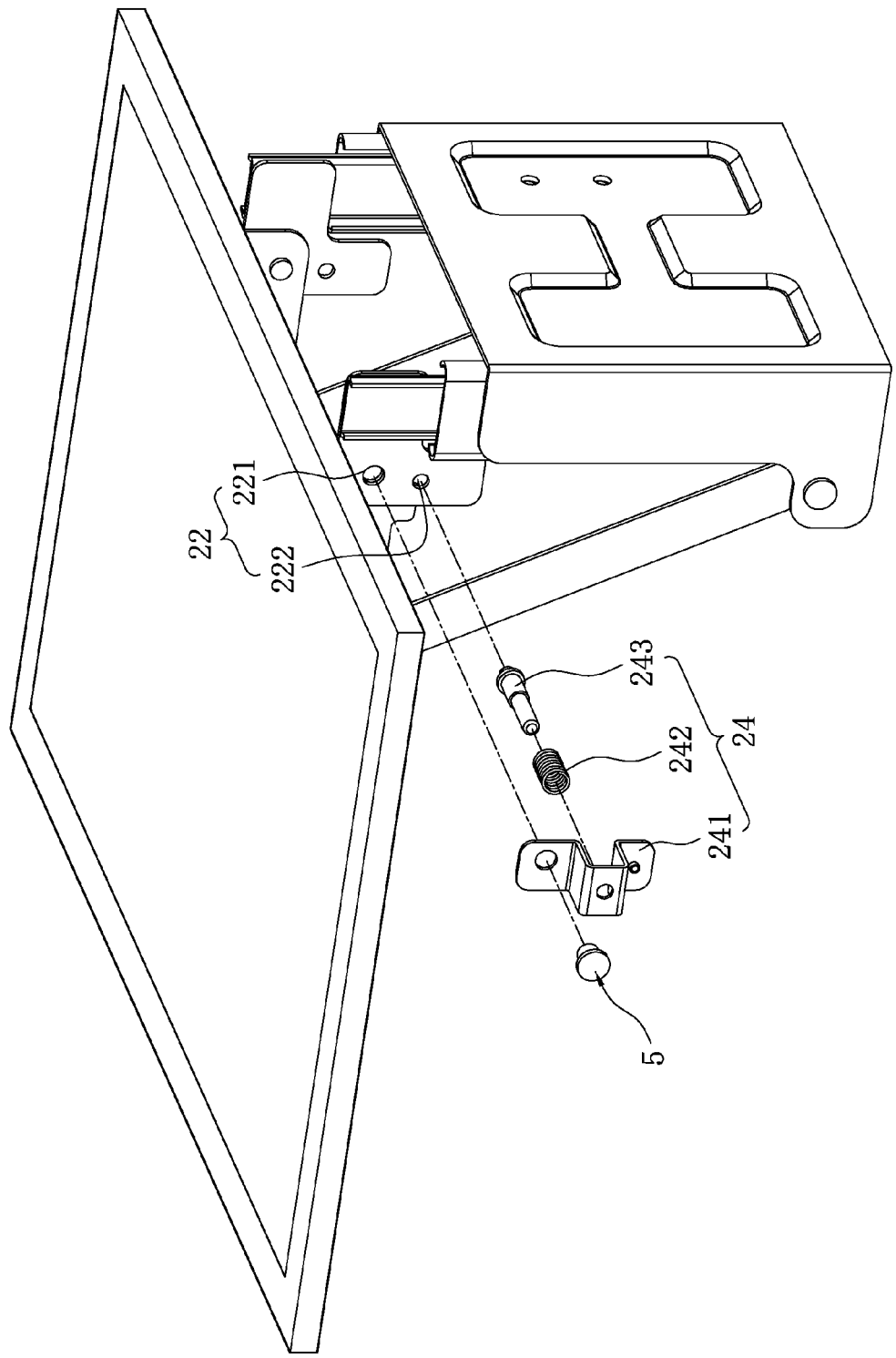
FIG. 9 is a partial exploded view of a monitor mounting apparatus for a third embodiment of the instant disclosure.
Figure 10:
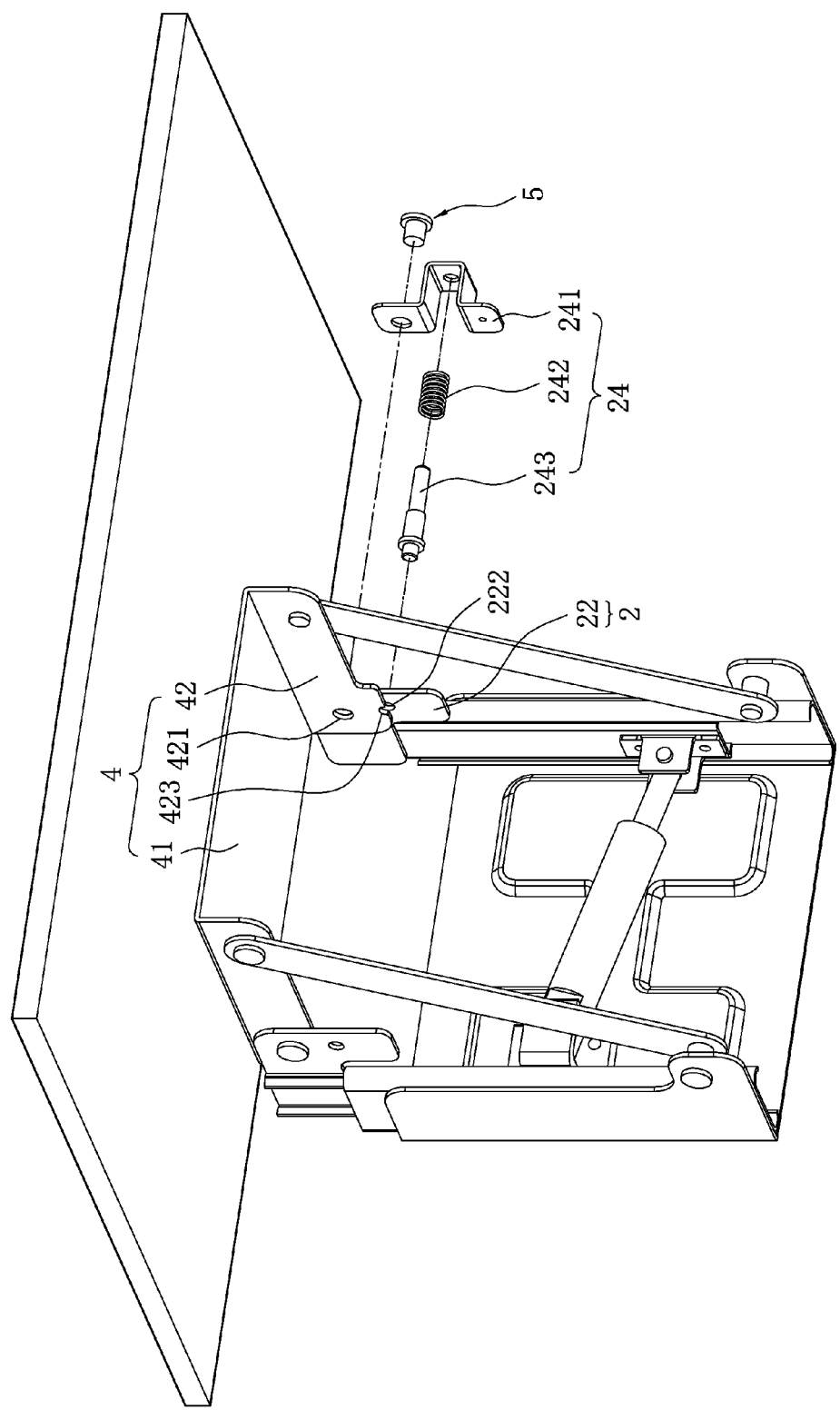
FIG. 10 is a partial exploded view of the monitor mounting apparatus in FIG. 9 taken from another angle.
Figure 11:
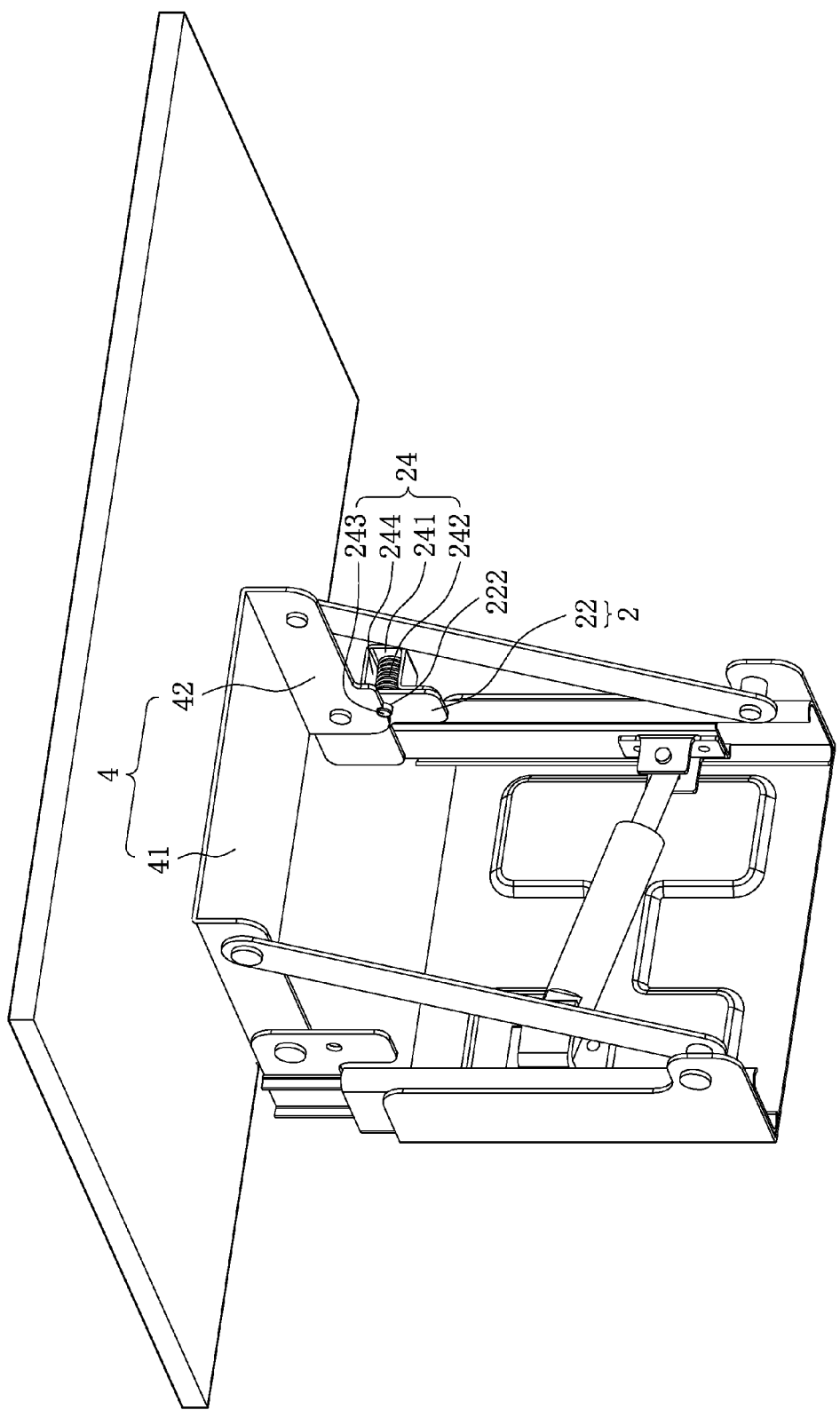
FIG. 11 is a perspective view of the monitor mounting apparatus in FIG. 9 while in use.

Please refer FIGS. 9 to 11, which show a monitor mounting apparatus for a third embodiment of the instant disclosure. In comparison to the second embodiment, the difference being the adjusting unit 2 of the instant embodiment is further provided with at least one locking mechanism 24. The locking mechanism 24 includes a retainer 241, a compression spring 242, and an insert 243.

Furthermore, at least one of the connecting portions 42 of the tilt bracket 4 has a notch 423 along the edge portion thereof away from the support plate 41 for complementing the locking mechanism 24. Whereas each of the connecting members 22 of the adjusting unit 2 has a fixing hole 222 formed thereon.

The retainer 241 is U-shaped with one end thereof projected through by the pivot pin 5. The same pivot pin 5 further penetrates the hole 221 of the connecting member 22 of the adjusting unit 2 and the hole 421 of the notched connecting portion 42. Whereas the opposite end of the retainer 241 is in contact with the corresponding connecting member 22. In other words, the retainer 241 is secured onto the corresponding connecting member 22, where an accommodating space 244 is formed therebetween facing the locking hole 222. The accommodating space 244 is in communication with the interior facing surface of the corresponding connecting member 22 away from the retainer 241 via the locking hole 222.

The compression spring 242 is arranged in the accommodating space 244. The insert 243 is partly projected through the compression spring 242 and the corresponding locking hole 222, where the compression spring 242 is abutted to the retainer 241 and the insert 243 on opposite ends thereof. The compressed spring 242 exerts a force on the insert 243. In view of FIG. 10, the exerted force would be a leftward force applied to the insert 243. Meanwhile, when the tilt bracket 4 is at the second operational position, the locking hole 222 is aligned to the notch 423. The alignment allows the insert 243 to be pushed out of the locking hole 222 by the compression spring 242 and received by the notch 423. Thus, the corresponding connecting portion 42 of the tilt bracket 4 can rest on the insert 243 and be upheld securely at the second operational position.

Moreover, a handle (not shown) may be connected to the insert 243. To disengage the insert 243 from the tilt bracket 4, the user can operate the handle to release the insert 243 from the locking hole 222.

For the instant embodiment, the locking mechanism 24 enables the tilt bracket 4 to be upheld securely at the second operational position. However, in practice, the exact locations of the locking mechanism 24 and the locking holes 222 are not restricted but can be arranged accordingly to assist in upholding the tilt bracket 4 at any angular position.

Fourth Embodiment

Figure 12:
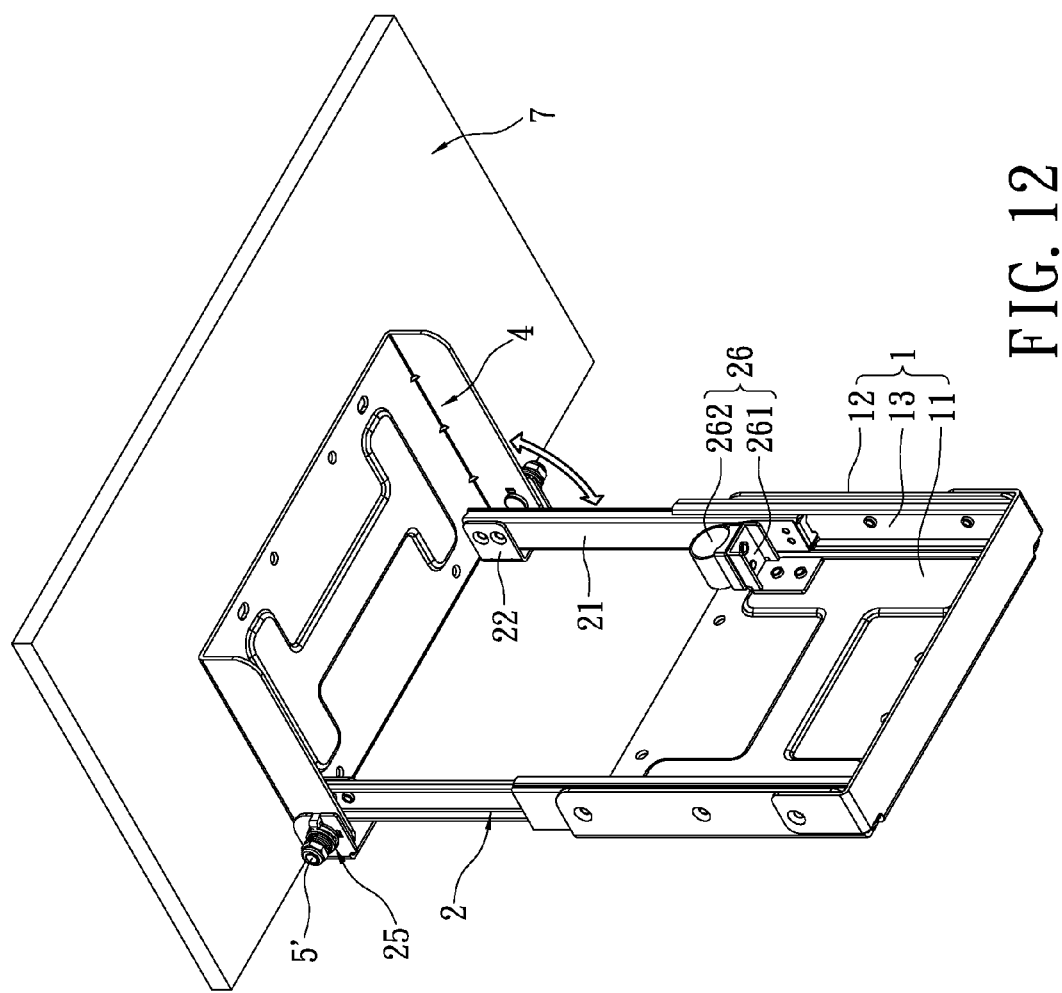
FIG. 12 is a perspective view of a monitor mounting apparatus for a fourth embodiment of the instant disclosure in use.

Please refer to FIG. 12, which shows a monitor mounting apparatus for a fourth embodiment of the instant disclosure. In comparison to the first embodiment, the mounting apparatus of the instant embodiment is not provided with the tilt arms 3, while the adjusting unit 2 of the instant embodiment further includes a pair of washer assemblies 25 and a stabilizing unit 26.

Figure 13:
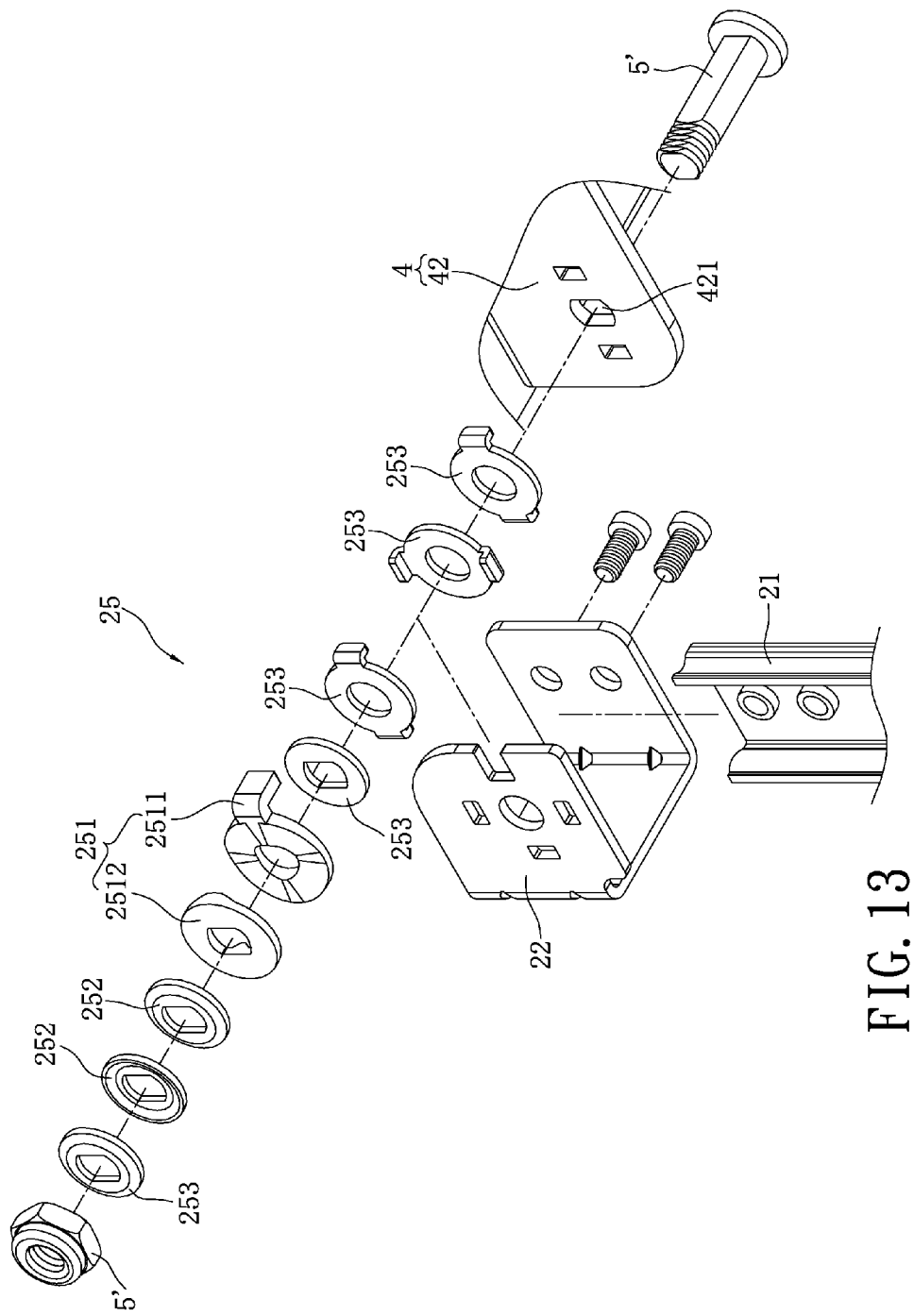
FIG. 13 is a partial exploded view of the monitor mounting apparatus in FIG. 12.

As shown in FIGS. 12 and 13, each of connecting members 22 of the adjusting unit 2 is U-shaped having opposite sidewalls. One of the sidewalls of each connecting member 22 is secured to the top inner portion of the respective sliding member 21. Whereas the other sidewall is secured by a fastener 5' (screw and nut). The screw, in particular, penetrates the respective hole 421 of the connecting portion 42, the washer assembly 25, the corresponding sidewall of the connecting member 22, and screws into the nut. Thereby, the connecting portions 42 of the tilt bracket 4 are pivotally connected to the respective connecting members 22 of the adjusting unit 2.

Figure 14:
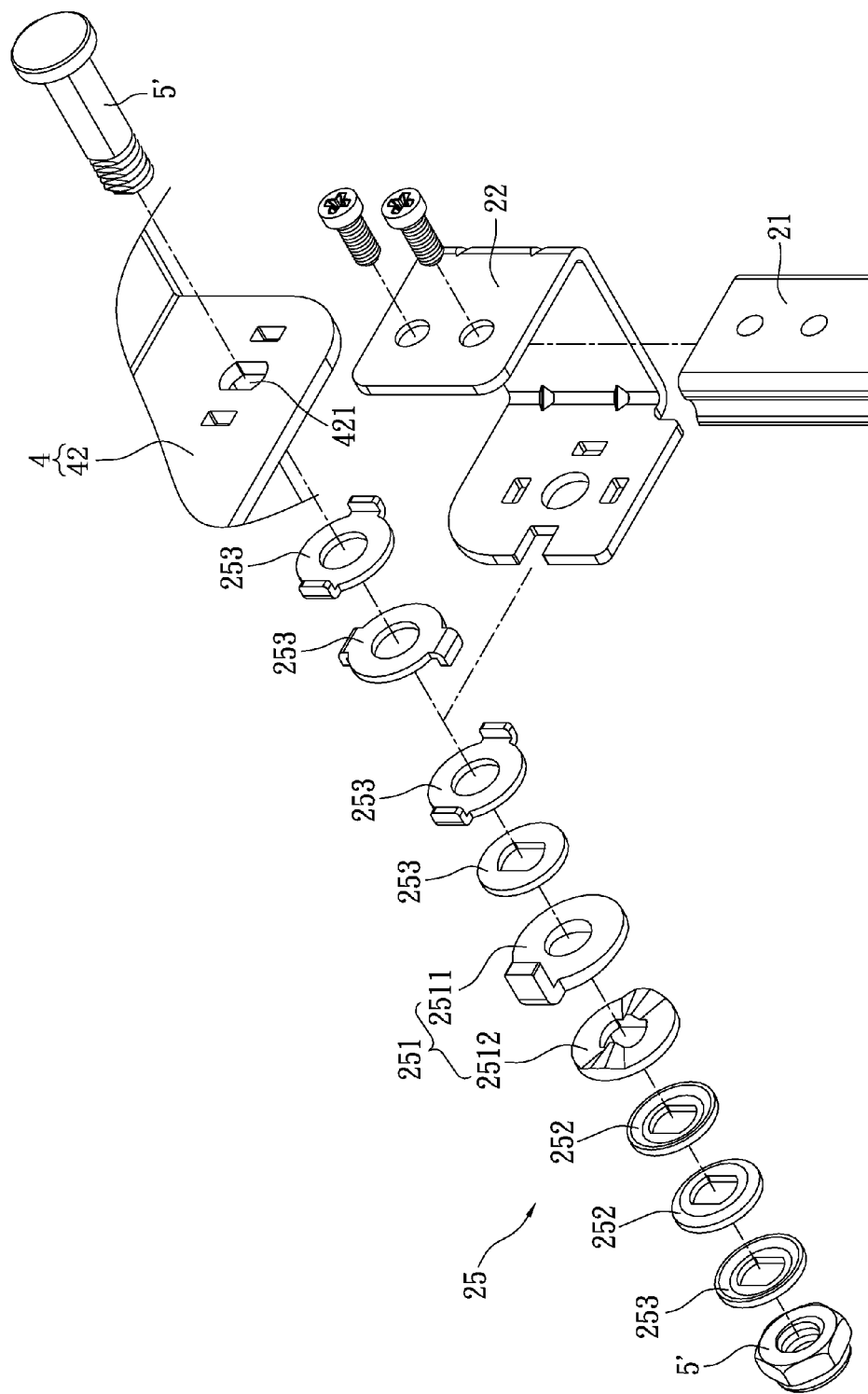
FIG. 14 is a partial exploded view of the monitor mounting apparatus in FIG. 12 taken from another angle.

As shown in FIGS. 13 and 14, the screw (fastener 5') has a non-cylindrical body with two opposite flat surfaces. The corresponding hole 421 of the connecting portion 42 is shaped correspondingly with the screw body. Therefore, the fasteners 5' can pivot along with the tilt bracket 4. Each of the washer assemblies 25 includes a pair of torque washers 251 and seven washers 252, 253. One of the torque washers 251 is a concave washer 2511, whereas the other torque washer 251 is a convex washer 2512.

The concave washer 2511 has a circular hole formed centrally thereon, for allowing the screw body (fastener 5') to be rotatably penetrated therethrough. The concave washer 2511 is fixedly engaged to the other sidewall of the corresponding U-shaped connecting member 22. Thus, the concave washer 2511 is restricted against pivoting with the tilt bracket 4. A pair of grooves and a pair of ribs are arranged alternatively on the surface of the concave washer 2511 facing away from the connecting member 22 (as in FIG. 13, the grooves are arranged on the upper and lower portions of the concave washer 2511, while the ribs are arranged on the left and right portions of the concave washer 2511). Each of the grooves and each of the ribs are arranged normally to each other on the concave washer 2511. The thickness of the concave washer 2511 gradually increases from the grooves toward the ribs.

The convex washer 2512 has a hole formed centrally thereon, where shape of the hole matches the shape of the screw body (fastener 5'). The hole allows the screw body to penetrate the convex washer 2512 and fixedly engaged therewith. Through the fastener 5', the convex washer 2512 can pivot with the tilt bracket 4. Two protrusions are formed on the convex washer 2512 facing toward the concave washer 2511. The protrusions are aligned on the same axis in being 180° apart from each other.

Moreover, when the tilt bracket 4 and the monitor 7 are oriented at the first operational position, the protrusions of the convex washer 2512 are received by the grooves of the concave washer 2511. When adjusting toward the second operational position (as in FIG. 12), the protrusions of the convex washer 2512 would rotatably rubbing the surface of the concave washer 2511 in response to the weight of the tilt bracket 4 and the monitor 7, thereby anchoring the tilt bracket 4 at desired angular position. In addition, when adjusting the monitor 7 from the first operational position toward the second operational position, the center of mass of the monitor 7 is gradually shifted outward with respect to the mounting apparatus itself. Thus, the induced torque gradually increases. Since the thickness of the concave washer 2511 gradually increases from the grooves toward the ribs, the rubbing between the protrusions of the convex washer 2512 and the surface of the concave washer 2511 also gradually increases. Thus, when the convex washer 2512 is rotated against the concave washer 2511, the rotation becomes increasingly tighter. Thereby, the tilt bracket 4 and the monitor 7 can be adjusted to any angular position within the adjustment range of first and second operational positions.

The seven washers 252, 253 include two convex washers 252 and five locking washers 253. Each of the convex washers 252 are provided with a hole formed centrally thereon matching in shape with the screw body (fastener 5'). The hole allows the screw body to penetrate the corresponding convex washer 252 and fixedly engaged therewith. Thus, the convex washers 252 can be pivoted with the tilt bracket 4. Furthermore, depending on the tightness between the washers of each washer assembly 25, the contacting surfaces between the convex washers 252 and adjacent washers (i.e., convex washer 2512 and locking washer 253) would vary in providing different torque. The locking washers 253 serve to lower the friction between different fastening parts.

Figure 15:
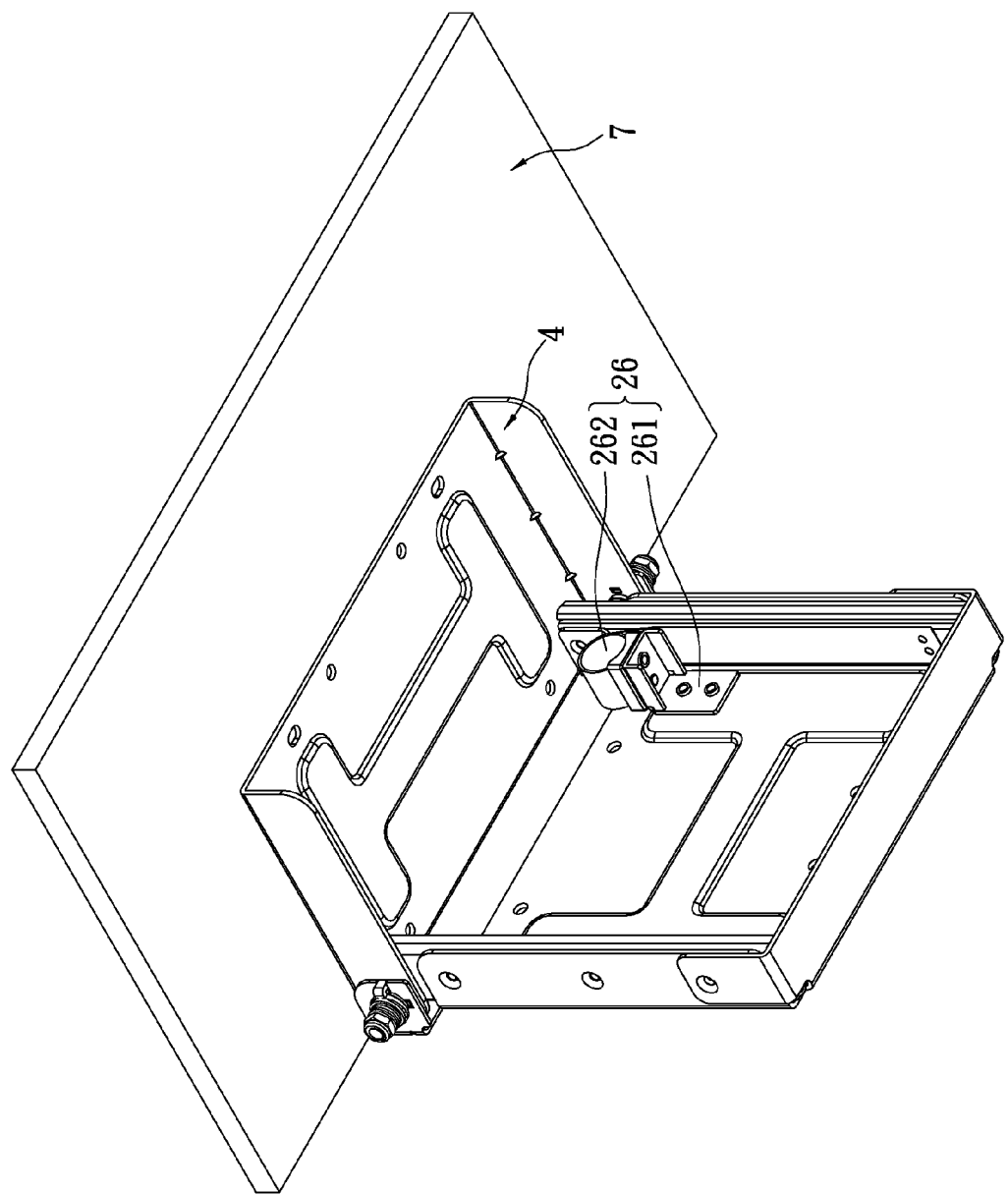
FIG. 15 is another perspective view of the monitor mounting apparatus in FIG. 12 while in use.

Please refer to FIGS. 12 and 15. The aforementioned stabilizing unit 26 includes an L-bracket 261 and a constant-force spring 262. The L-bracket 261 is arranged adjacent to one of the sidewall 12 of the base 1 and secured to the top portion of the rear wall 11 of the base 1. The constant-force spring 262 is constructed as a rolled ribbon having a protruding section. The constant-force spring 262 is disposed on the L-bracket 261 and adjacent to the corresponding top portion of the guiding member 13. Whereas the protruding section of the constant-force spring 262 is secured to the bottom portion of the corresponding sliding member 21.

More specifically, when the sliding members 21 are moved between the highest and lowest positions, one of the sliding members 21 would unroll the constant-force spring 262 in creating a constant restoring force. The length of the unrolled constant-force spring 262 depends on the location of the sliding members 21. The restoring force of the constant-force spring 262 is substantially the weight of the tilt bracket 4 and the monitor 7. Thereby, the tilt bracket 4 and the monitor 7 can be anchored anywhere in between the highest and lowest positions of the sliding members 21.

The washer assemblies 25 and the stabilizing unit 26 enable the mounting apparatus to adjust the connecting members 22 and the sliding members 21, respectively, in an independent fashion. Thus, the tilt bracket 4 and the monitor 7 can be adjusted accordingly to meet the user's needs.

Based on the above, the mounting apparatus of the instant disclosure uses the sliding members 21 and the connecting members 22 of the adjusting unit 2 to anchor the tilt bracket 4 at any angular position within the range defined by the first and second operational positions. Thus, the ability to adjust the height and the angular orientation of the tilt bracket 4 is achieved.

Furthermore, the mounting apparatus can further be provided with the self-positioning mechanism 23 and the locking mechanism 24. Thus, the mounting apparatus can be self-positioned in saving effort exerted by the user and providing convenience. Alternatively, the mounting apparatus can use the washer assemblies 25 and the stabilizing unit 26 to cooperatively adjust the angular and vertical positions of the tilt bracket 4, respectively.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A monitor mounting apparatus arranged on a working surface, comprising:
    a base, arranged on the working surface, having at least one guiding member;
    an adjusting unit having at least one sliding member, at least one plate-like connecting member interconnected with the sliding member, and a locking mechanism, wherein the sliding member is movable with respect to the guiding member, the connecting member has a locking hole formed thereon; and
    a tilt bracket having a support plate and at least one connecting portion extended from the support plate, wherein the connecting portion has a notch and is pivotally connected to one end of the connecting member of the adjusting unit, while the other end of the connecting member is fixed to the sliding member,
    wherein the locking mechanism works cooperatively with the locking hole of the connecting member for selectively engaging the notch of the connecting portion,
    wherein an outer end portion is defined on one end of the tilt bracket away from the connecting member, wherein the tilt bracket can be pivotally oriented between a first operational position and a second operational position, and wherein the shortest distance between the outer end portion and the working surface is less when the tilt bracket is at the first operational position than when the tilt bracket is at the second operational position.

2. The monitor mounting apparatus of claim 1, wherein the guiding member is an elongated plate having a pair of oppositely bent side portions which defines an elongated slot wherein the sliding member of the adjusting unit is slidably adapted to travel along the elongated slot.

3. The monitor mounting apparatus of claim 2, wherein the base has a rear wall adapted for mounting to the working surface, wherein the tilt bracket has a support plate, wherein when the tilt bracket is oriented at the first operational position, the angle between the support plate of the tilt bracket and the rear wall of the base is 0°, wherein when the tilt bracket is oriented at the second operational position, the angle between the support plate and the rear wall is 90°.

4. The monitor mounting apparatus of claim 3, further comprising a self-positioning mechanism, including a pair of fixing members and a gas spring, wherein the fixing members are respectively secured to the rear wall of the base and one of the sliding members of the adjusting unit, and wherein the opposite ends of the gas spring are pivotally respectively connected to the fixing members.

5. The monitor mounting apparatus of claim 1, wherein the locking mechanism includes a retainer, a compression spring, and an insert, wherein opposite ends of the retainer are secured around the locking hole onto the connecting member, wherein the retainer and the connecting member cooperatively define an accommodating space for receiving the compression spring, wherein the accommodating space is in communication with the locking hole, wherein the insert is partly projected through the compression spring and the locking hole, with the compression spring abutting to the retainer and the insert on opposite ends thereof, and wherein the insert can be selectively pushed out of the locking hole for engaging the notch.

6. The monitor mounting apparatus of claim 1, further comprising at least one tilt arm, wherein the base further has at least one fixing portion, wherein the tilt arm has a first end portion and an opposite second end portion, wherein the first end portion is capable of pivotally connected to the fixing portion of the base, wherein the second end portion is capable of pivotally connected to the connecting portion of the tilt bracket, when the tilt bracket is oriented at the first operational position, the connecting section between the sliding member and the connecting member is oriented at a first position, while when the tilt bracket is oriented at the second operational position, the connecting section between the sliding member and the connecting member is oriented at a second position.

7. The monitor mounting apparatus of claim 1, wherein when the tilt bracket is oriented at the first operational position, the distance between the top edge portion of the sliding member and the top edge portion of the guiding member is greater than the distance therebetween when the tilt bracket is oriented at the second operational position.

* * * * *